United States Patent [19]

Syme

[11] Patent Number: 5,376,203
[45] Date of Patent: Dec. 27, 1994

[54] ROTARY MOLDING APPARATUS AND METHOD

[76] Inventor: Robert W. Syme, 8350 Estero Blvd., Fort Meyers, Fla. 33931

[21] Appl. No.: 63,123

[22] Filed: May 14, 1993

Related U.S. Application Data

[63] Continuation of Ser. No. 717,525, Jun. 19, 1991, abandoned.

[51] Int. Cl.$^5$ .............................................. B32B 31/08
[52] U.S. Cl. ................................... 156/209; 156/87; 156/229; 156/472; 156/473; 156/494; 156/553; 264/284; 428/314.4
[58] Field of Search ............... 264/284, 46.1, 48; 156/209, 494, 219, 229, 79, 553, 87, 78, 472, 473; 428/314.4

[56] References Cited

U.S. PATENT DOCUMENTS

| | | | |
|---|---|---|---|
| 2,950,221 | 8/1960 | Bauer et al. | 156/78 X |
| 3,007,205 | 11/1961 | House | 156/78 X |
| 3,170,832 | 2/1965 | Wilson et al. | 156/78 X |
| 3,208,898 | 9/1965 | Chavannes et al. | 156/553 X |
| 3,220,902 | 11/1965 | Edwards | 264/46.1 X |
| 3,264,166 | 8/1966 | Lowery | 156/79 X |
| 3,378,432 | 4/1968 | Spencer | 156/209 X |
| 3,496,043 | 2/1970 | Ragan | 156/209 |
| 3,682,730 | 8/1972 | Haase | 156/79 |
| 3,698,973 | 10/1972 | Wisoteky et al. | 156/209 X |
| 3,879,508 | 4/1975 | Gilbert | 264/54 X |
| 3,887,678 | 6/1975 | Lewicki, Jr. | 156/209 X |
| 4,278,482 | 7/1981 | Poteet et al. | 156/209 X |
| 4,384,904 | 5/1983 | Kauffman et al. | 156/78 |
| 4,656,074 | 4/1987 | Conley et al. | 264/54 X |
| 4,710,415 | 12/1987 | Slosberg | 156/79 X |
| 4,824,498 | 4/1989 | Goodwin et al. | 156/71 |
| 4,995,141 | 2/1991 | Gould | 264/121 X |

FOREIGN PATENT DOCUMENTS

848863 8/1970 Canada .

*Primary Examiner*—Michael W. Ball
*Assistant Examiner*—Michele K. Yoder
*Attorney, Agent, or Firm*—Barry R. Lipsitz

[57] ABSTRACT

A method and apparatus for molding foamed materials for use as carpet underpadding is disclosed. In one aspect, the process and apparatus involves pulling a sheet of a foamed material through a first set of pull rolls at a first pull rate followed by heating the foamed material in order to decompose blowing agent present in the sheet thereby causing the sheet to expand or thicken. The heated sheet is then pulled through a second set of pull rolls which pull the heated sheet at a faster rate than the first pull rate in order to stretch the expanded sheet so that it returns to its original thickness. The surface of one of the rolls of the second set is provided with dimples or indentations uniformly spread on the surface thereof for producing protrusions on one side of the heated sheet. In one form of the apparatus, the roller with the dimples is cooled while the molded sheet is retained against this roller after formation of the dimples in order to provide cooling for the former to allow the protrusions to set properly. The molded sheet is further cooled as it is run along cooled rolls after which it is trimmed and collected.

16 Claims, 6 Drawing Sheets

ROTARY MOLDING APPARATUS AND METHOD

This application is a continuation of copending U.S. patent application Ser. No. 07/717,525 filed Jun. 19, 1991 now abandon.

FIELD OF THE INVENTION

The present invention relates to the fabrication of molded underpads for carpets.

BACKGROUND OF THE INVENTION

Carpet underpads must generally exhibit the properties of cushionability, flexibility and durability in order to achieve their full utility. As such, carpet underpads usually comprise a foamed material having an open cell structure. Currently, carpet underpads are fabricated using foamable materials based on urethanes. A drawback to using foams based on urethanes is that when burned they give off noxious and poisonous gases such as isocyanate. In order to render the underpads safer, blowing agents (also referred to as foaming agents) based on butane have been used, but this is expensive and non-economical. Blowing agents based on fluorocarbons are also known but are not acceptable from an environmental point of view.

SUMMARY OF THE INVENTION

The subject invention provides a method and apparatus for producing externally molded carpet underpad from polyolefin based foams. The invention also provides an apparatus and method for producing internally molded cushionable products.

In one aspect of the invention, a method of fabricating molded carpet underpadding includes providing a supply of closed cell foamed material, pulling the foamed material continuously from the supply using a first pulling means. The material is heated and pulled from the first pulling means by a second pulling means. The heated material is molded and then cooled.

In another aspect of the invention, a rotary molding apparatus for molding closed cell foamed material includes a first pulling means for continuously pulling the material from a supply thereof at a first predetermined pulling rate. A second pulling means is provided for pulling the material at a second predetermined pulling rate. The apparatus is provided with a molding means for molding the foamed material. The molding apparatus includes a heating means located between the first and second pulling means for heating the material before it is molded, and includes a cooling means positioned after the molding means for cooling the material following molding.

BRIEF DESCRIPTION OF THE DRAWINGS

Preferred and alternative embodiments of the rotary molding apparatus of the subject invention will now be discussed with reference to the accompanying drawings, in which.

DETAILED DESCRIPTION OF THE PREFERRED AND ALTERNATIVE EMBODIMENTS

Figure 1:
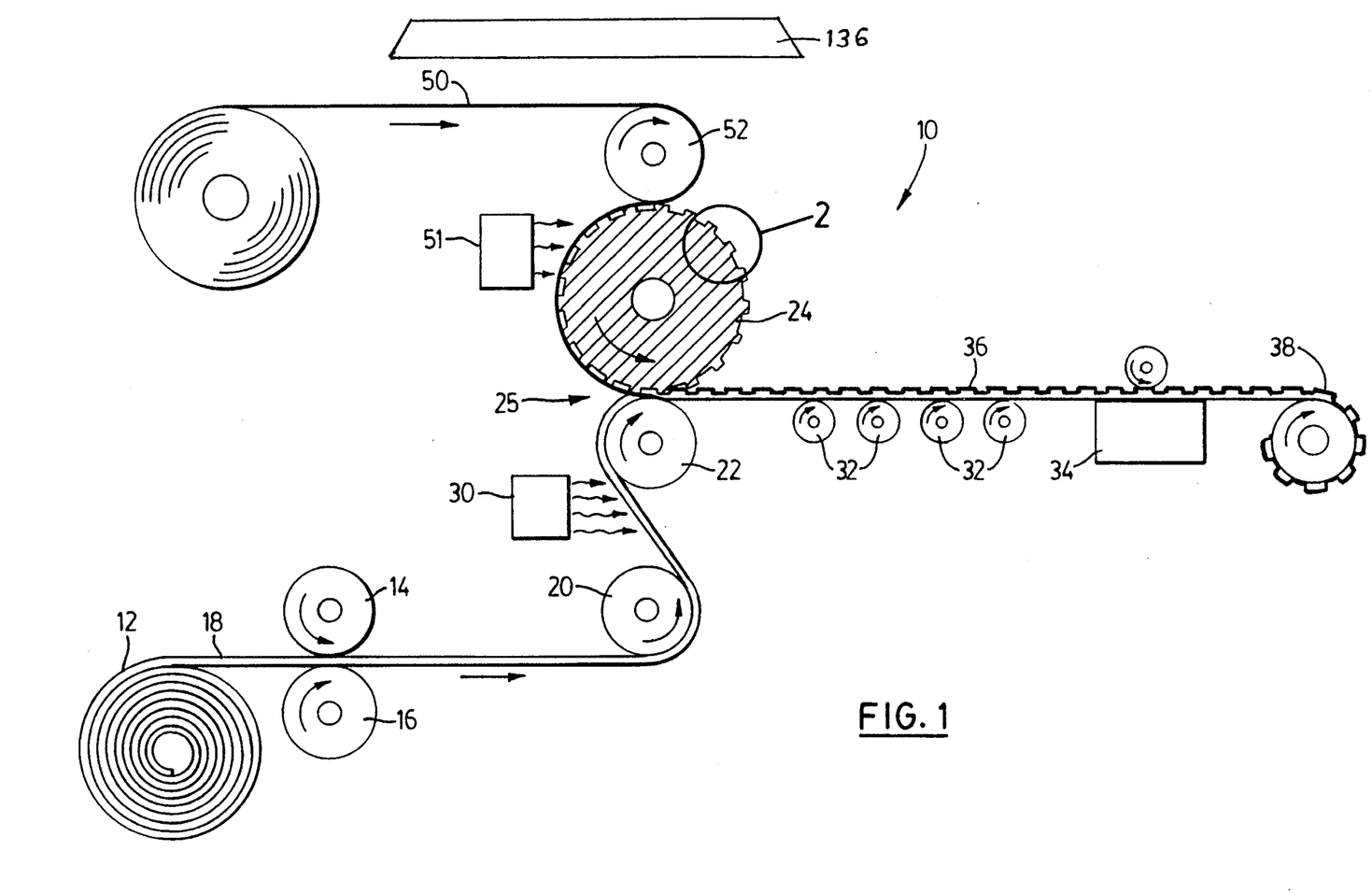
FIG. 1 is a diagrammatic elevational view of the molding apparatus of the subject invention.

Referring to FIG. 1, an apparatus for producing molded carpet underpadding is shown generally at 10. The starting sheet material from which the molded underpad is produced is shown in rolled form at 12. The inventor has determined that closed cell materials such as foamed polyolefins, comprise excellent starting materials for carpet underpads. Specifically, those foamable polyolefin materials fabricated using an economical blowing agent which, upon decomposition of the latter (activation) does not produce toxic gases are the preferred starting materials.

Canadian Patent No. 848,863 (Hosoda et al.) discloses various polyolefin based materials therein which may be used as starting materials in the subject invention. Some of the materials disclosed therein include low density polyethylene, high density polyethylene, polypropylene, and various copolymers such as ethylene-propylene, ethylene-vinyl acetate an ethylene-butane copolymer, to mention a few.

In the initial fabrication of these foamed materials, not all the blowing agent is decomposed (utilized) with the result that undecomposed blowing agent is present in the final foamed sheet. The advantageous utilization of this residual blowing agent in one embodiment of the process and apparatus of the subject invention will be described presently.

The rotary molding apparatus shown at 10 for fabricating molded carpet underpad includes a first set of opposed pull rolls at 14 and 16 for pulling sheet 18 from roll 12. A guide roll may be provided at 20 and a second pair of pull rolls 22 and 24 are provided wherein roll 24 includes the mold for molding sheet 18. Apparatus 10 includes a heater 30 located in close proximity to rolls 22 and 24 for heating sheet 18 prior to same being fed through nip 25 formed between rolls 22 and 24. Preferably, heater 30 is a radiant heater.

Figure 2:
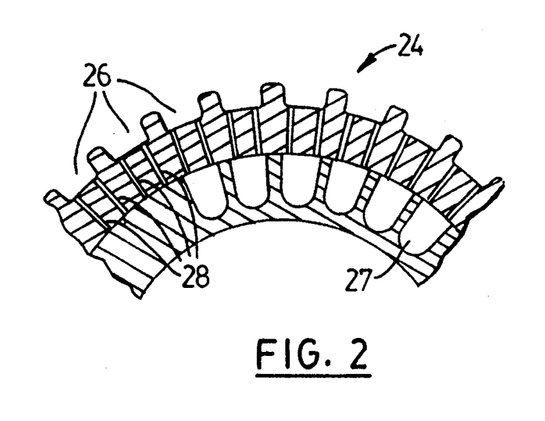
FIG. 2 is an enlarged sectional view of a portion of the molding roller shown in circle 2 of FIG. 1.

FIG. 2 shows a section of molding roll 24 provided with a plurality of indentations or dimples 26 uniformly distributed over the surface of roll 24 for molding protrusions on sheet 18. Extending from the surface of dimples 26 to the interior of roll 24 are channels 28 provided to act as vents for release of gas formed during the molding of the heated sheet. Channels 28 are in flow communication with channels 27 which provide air escapement when the material is compressed into the dimpled surface. It will be noted that molding roll 24 is hollow, but this is not shown in FIGS. 1 and 3 to 5 for the purposes of simplification. While the rotary apparatus disclosed above uses pressure to mold the foamed material, it will be understood that the molding could be accomplished solely by vacuum pulling, or by a combination of vacuum pulling and pressure. In such an arrangement, roll 24 would have a partial vacuum coupled to channels 27 which, in conjunction with vent holes 28, provide the necessary suction to mold the material passing through nip 25.

The temperature range to which the sheets must be heated will preferably be high enough to soften the material sufficiently in order that it may be molded and cause sufficient decomposition of the blowing agent and melting of the outer surface of sheet 18, but not so high that surface blistering or shrinkage of the foamed sheet occurs. A plurality of cooled rolls are provided at 32 while a trimming station is located at 34. The trimmed sheet may be collected in a variety of ways such as in roll form as shown at 38 in FIG. 1.

Figure 3:
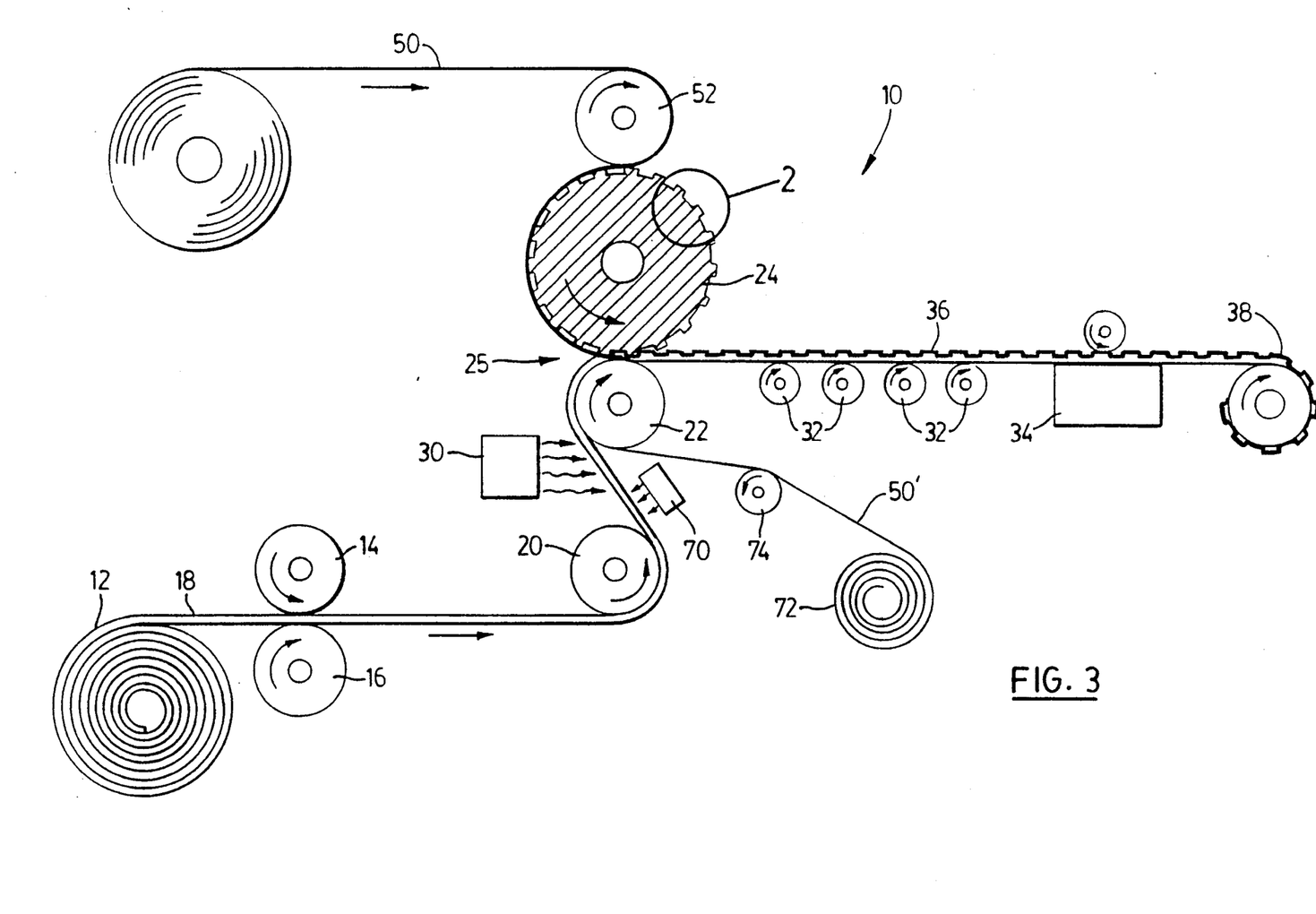
FIG. 3 is a diagrammatic elevational view of an alternative embodiment of the molding apparatus.

As an optional feature, a thin polyethylene protective layer or film may be fused to the molded sheet. Referring again to FIG. 1, a thin laminate material comprising polyethylene sheet 50 is fed from a supply thereof around a guide roller and 52 and through nip 25 after being heated by a heater 51. This sheet is fed between sheet 18 and molding roll 24 so that it forms a film or layer on the molded side of sheet 18. As sheet 18 is pulled past heater 30, the outer surface of the side facing the heater is preferably heated high enough (in the vicinity of 300° C.) so that it partially melts so that layer 50 is firmly fused or bonded thereto when layer 50 and sheet 18 pass through nip 25. This polyethylene layer 50 may be used to give the underpad greater strength, resilience and water resistance while inhibiting shrinkage and outgassing from the molded underpad. In another embodiment, both sides of sheet 18 may have laminated thereto the protective film. FIG. 3 illustrates an embodiment of the molding apparatus similar to that of FIG. 1 suitable for laminating a protective film or laminate to both sides of sheet 18 which includes a second heater at 70, a second supply of laminate material in the form of polyethylene film located at 72 and a guide roll at 74 for feeding film 50'.

Figure 4:
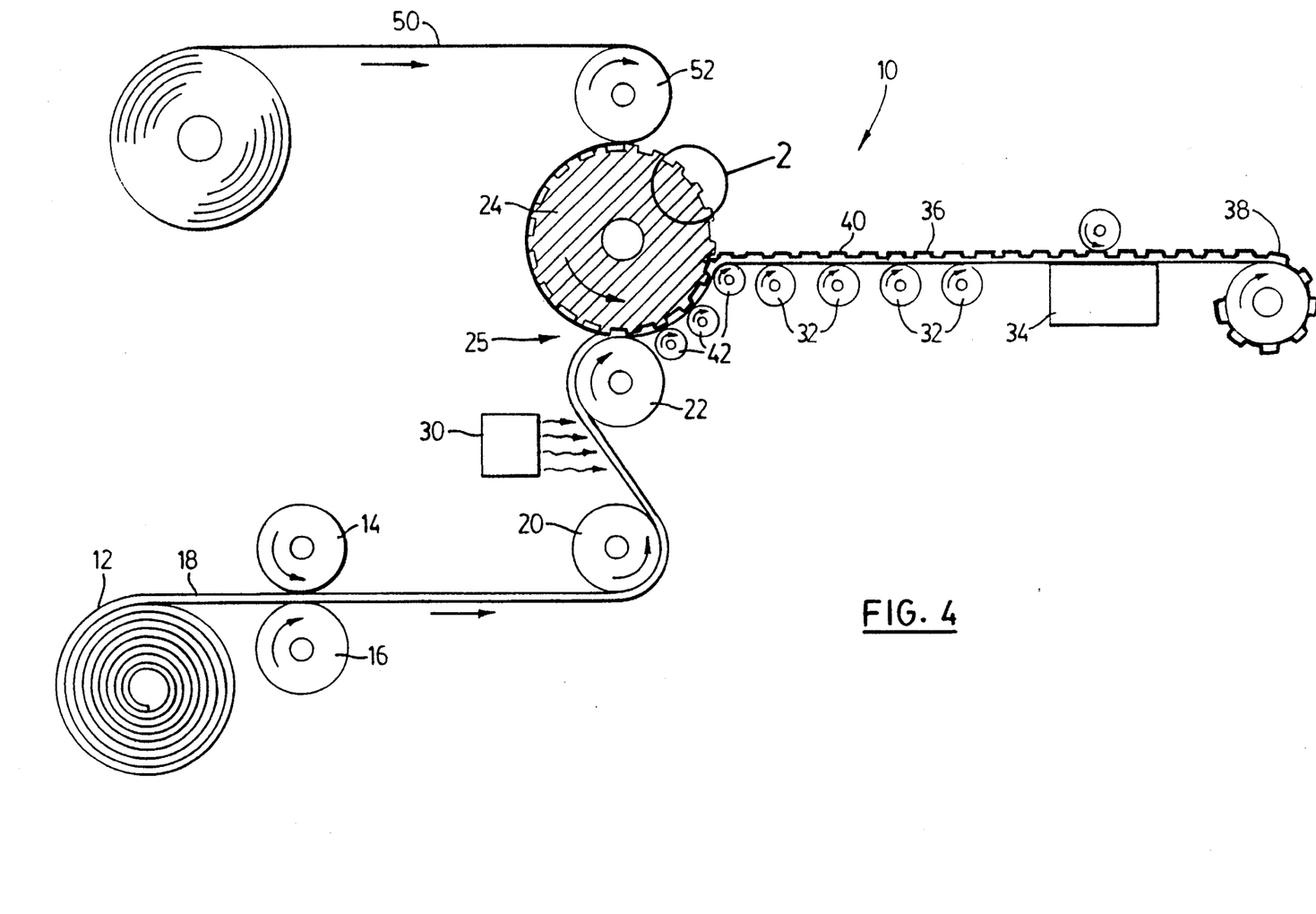
FIG. 4 illustrates another embodiment of the molding apparatus of the subject invention.
Figure 6:
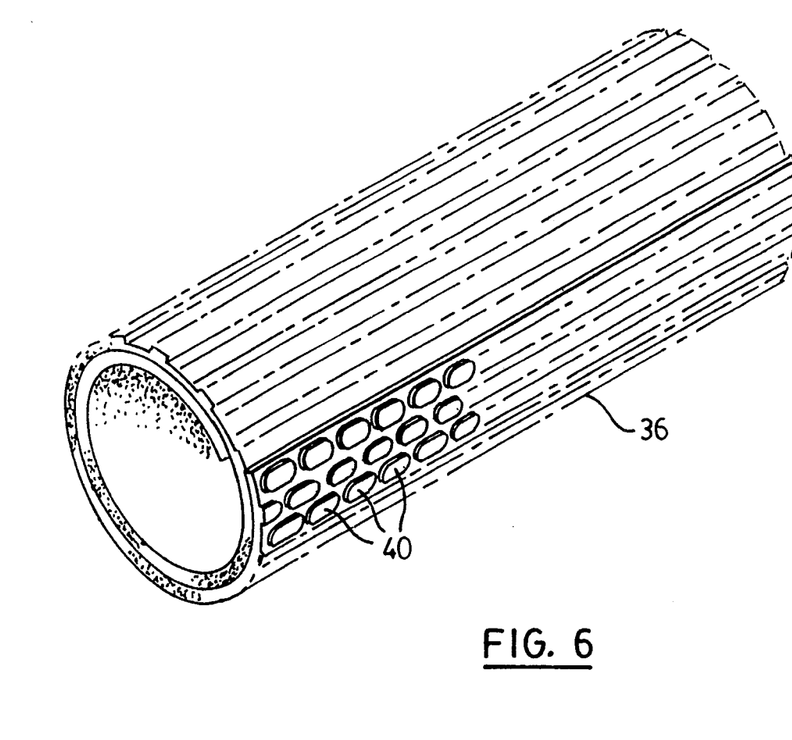
FIG. 6 is a perspective view of a portion of a roll of carpet underpadding produced by the molding apparatus of the subject invention.

FIG. 4 illustrates another embodiment of a rotary molding apparatus at 60 of the subject invention which includes a series of rolls shown at 42, the purpose of which is to maintain molded sheet 36 against cooled molding roller 24 in order to provide better cooling and setting of protrusions 40 (see FIG. 6).

Figure 5:
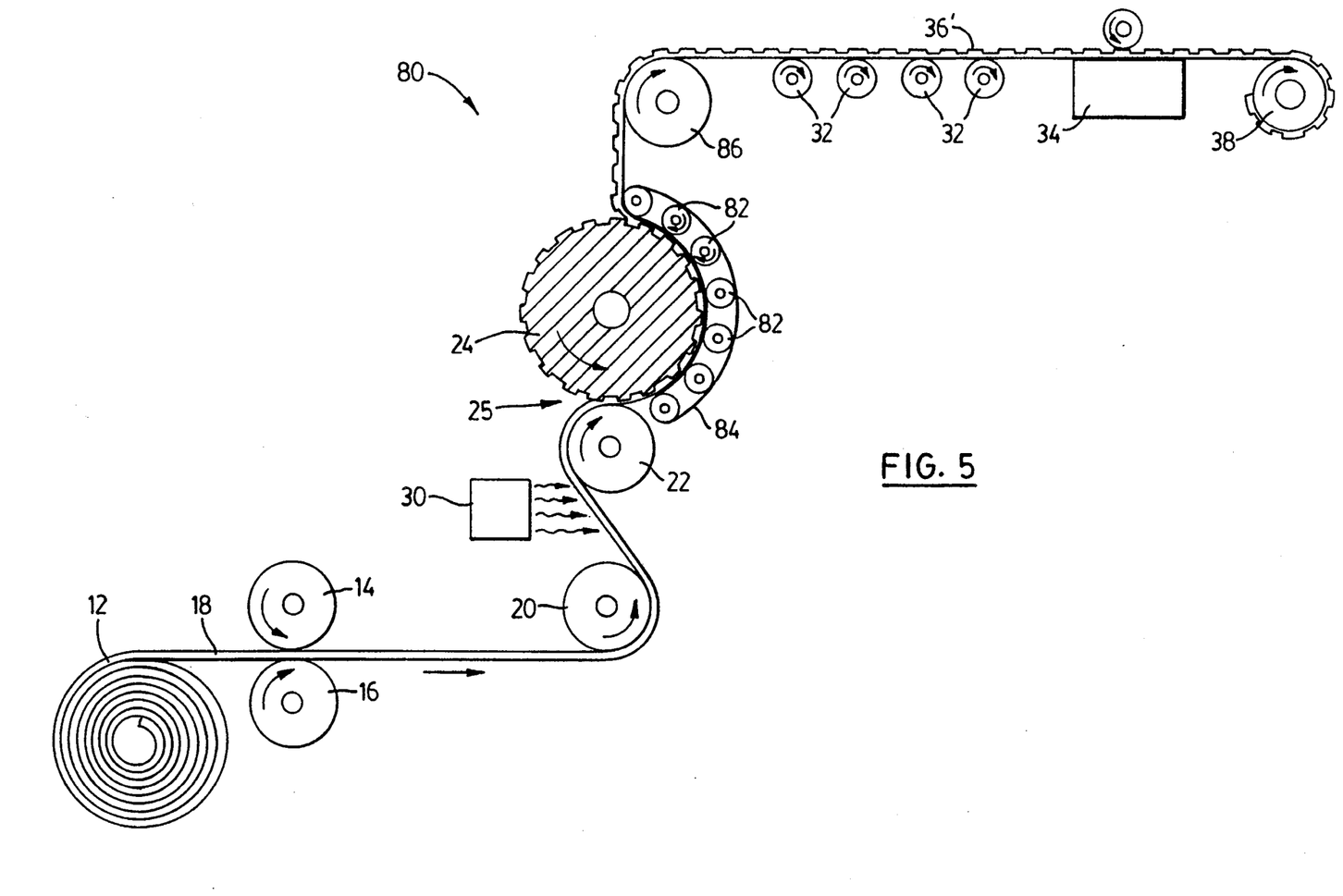
FIG. 5 is a diagrammatic elevational view of a preferred embodiment of the rotary molding apparatus of the subject invention.

FIG. 5 illustrates a preferred embodiment of a rotary molding apparatus at 80 which includes a series of water cooled rolls 82 in addition to an endless belt 84 wherein belt 84 may be substantially the same width as roller 24. A guide roll 86 is provided for guiding molded sheet 36 to trimming station 34. If belt 84 is not included, rolls 82 may be teflon coated in order to reduce friction between the molded sheet and the rolls. The rotary molding apparatus may also include means (not shown) for applying a protective laminate to one or both sides of the sheet, as in FIGS. 1 and 2.

Referring again to FIG. 1, in operation, rolls 22 and 24 are counter-rotated each at an angular velocity sufficient to pull sheet 18 therethrough at a higher rate than that at which rolls 14 and 16 pull sheet 18. Once sheet 18 passes by heater 30, the residual blowing agent contained therein decomposes causing sheet 18 to expand. Heater 30 heats the polyolefin sheet to a sufficiently high temperature in order to decompose the blowing agent as sheet 18 is being pulled through rolls 22 and 24. The power output of heater 30 will depend to some extent on the color of the starting sheet. Specifically, a higher heater power output will be required for lighter colored sheets than for darker colored sheets since the former will absorb less heat than the latter.

Sheet 18 may be pulled through nip 25 at a sufficiently higher rate than the rate of pull through rollers 14 and 16 so that heated sheet 18 is simultaneously molded and stretched so that it returns to its pre-heated thickness, thereby producing molded underpad 36 (see FIG. 6). As a non-limiting example, rolls 14 and 16 are rotated at the requisite speed necessary to give a pull rate of approximately 17 square feet/minute and rolls 22 and 24 are rotated at such speeds necessary to give a pull rate approximately 30% faster than that of rollers 14 and 16. In this way, the resulting molded underpad 36 will be approximately 30% longer than the starting sheet and roughly the same thickness. Thicknesses of the starting material for carpet underpad applications are in the range of 0.635 cm ($\frac{1}{4}$") to 1.270 cm ($\frac{1}{2}$") while widths are variable, depending on the preferred width of the rolls.

One of the second set of rolls, preferably roll 24, may be cooled or maintained at a constant temperature lower than heated sheet 18 so that the resulting molded sheet is cooled after molding. Temperatures of 20°–25° C. have been found suitable to give a good cooling effect but it will be appreciated that other temperatures in this vicinity, higher or lower, may also be acceptable.

The molded underpad is then fed along the cooled rolls shown at 32 whereupon it is fed into trimming station shown at 34 and trimmed to the desired width and collected into a roll at 38.

It has been observed that by combining reheating of the polyolefin sheet in addition to calendering same results in an improvement in the back (unmolded) surface of the sheet making it generally smoother which renders the molded sheet easier to work with, when, for example, carpet is being laid over the latter.

The operation of the preferred embodiment of the rotary molding apparatus of the present invention shown at 80 in FIG. 5 is similar to that of FIG. 1 except that molded sheet 36' is maintained against roll 24 for approximately half the circumference of the latter. In this preferred embodiment, the material feed rate through apparatus 80 may be faster than the feed rate through apparatus 10 of FIG. 1. For example, feed rates of approximately 36 square feet/minute may be employed, with the higher rates possible due to the fact that molded sheet 36' is maintained against roller 24 for an extended distance thereby ensuring proper setting and cooling of the protrusions.

The length and thickness of the molded material may be varied depending on the relative pull rates of the two sets of pull rolls. Thus, the length may be varied anywhere from 0–30% while the thickness can be varied in the range 0–10% higher than the thickness of the original starting material. The molded materials produced with the maximum length increase will be thinnest and vice versa.

FIG. 6 shows a perspective view of a roll of molded sheet underpad 36 provided with elongate protrusions 40. Since the purpose of protrusions 40 is to increase the cushionability of underpad 36, the latter is normally laid on the floor with protrusions 40 against the floor surface.

Figure 7:
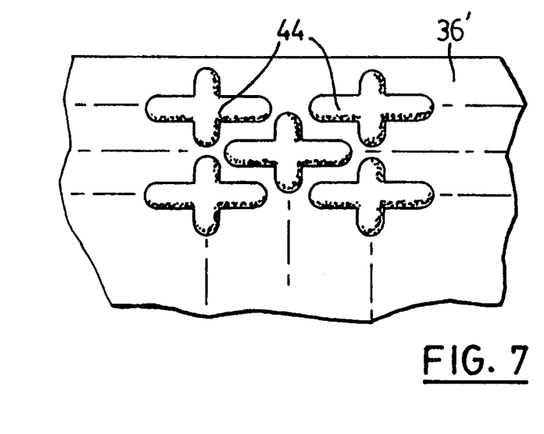
FIG. 7 is a top view of a portion of a molded carpet underpad similar to FIG. 3 but showing a differently shaped protrusion.
Figure 8:
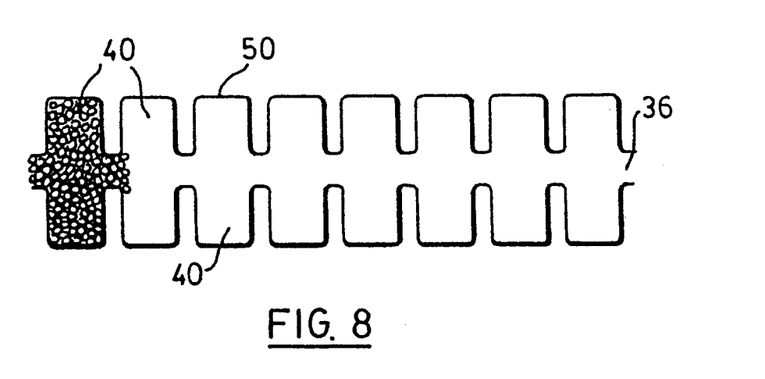
FIG. 8 is a cross-sectional view of an embodiment of a foamed material produced in accordance with the subject invention.

FIG. 7 illustrates an alternative protrusion pattern at 44 which may be molded into polyolefin sheet 36'. An advantage of this cross-shaped protrusion pattern is that the resulting molded sheet may be less prone to curling thus rendering the material easier to work with.

In other embodiments of the process and apparatus for molding carpet underpad, both sides of the polyolefin sheet may be molded with the same or differently shaped protrusions. To achieve this, the molding apparatus of any of FIGS. 1, 3, 4 or 5 may be modified by substituting roll 22 with another molding roll (not shown) similar to roll 24 which is provided with the indentations necessary to give the desired protrusion pattern.

It will be appreciated by those skilled in the art that the molding apparatus of FIGS. 1, 3, 4 or 5 may be used for molding carpet underpadding in a one step process wherein the sheet expansion step is excluded. Specifically, by heating the sheet material to a temperature lower than the blowing agent decomposition temperature, said material may still be molded by rotating rolls 14, 16 and 22, 24 at such speeds necessary to give the same pull rates.

The starting material from which the underpad is molded has been illustrated as being a roll of foamed material. However, it will be apparent to those skilled in the art that other possibilities exist. For example, the starting material could be fabricated in sheet form using an extruder/heater assembly (not shown) placed adjacent pull rolls 14 and 16. The resulting extruded foamed sheet would be fed through pull rolls 14 and 16 and molded in the manner discussed above wherein the blowing agent is decomposed by heating via heater 30.

While the preferred embodiments employ rollers for pulling the material, other rotary pulling devices could be used such as endless conveyors, one of which could be run in opposition to a molding roller (not shown).

It will be apparent that in addition to providing carpet underpadding, the molded polyethylene sheet of the present invention may be used for other applications. Specifically, being a good sound absorber, the sheet may be employed for sound proofing. Being waterproof, resistant to degradation and being resistant to mildew, the molded sheet may be used for coating of concrete and the like. It may also be used for heat insulation. The preferred thicknesses of the molded sheets would depend on the particular application for which the material is being produced.

It will also be apparent to those skilled in the art that the thermal rotary molding apparatus disclosed herein may be applied to externally molding other materials besides the polyolefins. For example, any flexible moldable material should be moldable using the process disclosed herein. If such materials contain components which produce toxic products upon heating, the molding apparatus of the present invention may be readily provided with a suitable ventilation system 136.

Similarly, while the present invention has been described and illustrated with respect to the preferred and alternative embodiments of the molding method and apparatus, it will be appreciated that numerous variations of the method and apparatus may be made without departing from the scope of the invention, which is defined in the appended claims.

I claim:

1. A method of fabricating molded carpet underpadding, the method comprising the steps of:
   (a) providing a supply of closed cell foamed material containing blowing agent;
   (b) continuously pulling said foamed material from said supply at a predetermined first pulling rate using a first pulling means;
   (c) heating said pulled foamed material to soften same and cause decomposition of said blowing agent and expansion of the foamed material;
   (d) continuously pulling said heated material from said first pulling means at a predetermined second pulling rate which is greater than said first pulling rate using a second pulling means;
   (e) molding protrusions on said heated material using a molding roll provided with numerous vent holes;
   (f) venting gas or air through said vent holes; and
   (g) cooling said molded material.

2. A method according to claim 1 wherein said heated material has protrusions molded on one side thereof.

3. A method according to claim 1 wherein said protrusions are molded on both sides of said heated material.

4. A method according to claim 1 wherein said protrusions are elongate protrusions uniformly spaced over said material.

5. A method according to claim 1 wherein said protrusions are cross-shaped protrusions uniformly spaced over said material.

6. A method according to claim 1 further comprising the steps of providing a supply of film material, continuously pulling said film material from said supply and fusing said film material to said heated foamed material.

7. A method according to claim 6 wherein the film material is fused to the molded side of said heated material.

8. A method according to claim 6 wherein the film material is fused to the unmolded side of said heated material.

9. A method according to claim 6 wherein the film material is fused to both sides of said heated material.

10. A method according to claim 6 wherein the film material is polyethylene sheet.

11. A method according to claim 1 including the step of trimming the molded sheet.

12. A method according to claim 1 wherein the second pulling means stretches said expanded material substantially back to its original thickness.

13. A method according to claim 1 wherein the foamed material is a polyolefin selected from the group consisting of low density polyethylene, high density polyethylene, and polypropylene.

14. A method according to claim 1 wherein the material is an olefin based copolymer selected from the group consisting of ethylene-butane copolymer, ethylene-propylene copolymer and ethylene-vinyl acetate copolymer.

15. A method according to claim 6 wherein said film material is fused to said foamed material simultaneously with said step of molding said foamed material.

16. A rotary molding apparatus for molding closed cell foamed materials comprising:
   (a) a first pulling means for continuously pulling a closed cell foamed material to be molded from a supply thereof at a predetermined first pulling rate;
   (b) a second pulling means comprising a pair of pull rolls for continuously pulling the material from the first pulling means at a predetermined second pulling rate, said pair of pull rolls including at least one dimpled roller which is provided with cooling means for cooling said dimpled roller;
   (c) a supply of film material;
   (d) first heating means located between the first and second pulling means for heating said foamed material;

(e) molding means located after the first heating means for molding said heated material;
(f) a second heating means for heating said film material, said second heating means being located between said supply of film material and said molding means; and
(g) guiding means for guiding said film material to said molding means, said guiding means comprising a guide roll adapted to temporarily retain said film material against a portion of said dimpled roller prior to delivery of said film material to a nip formed by said pair of pull rolls;

wherein said second heating means is located between said guide roll and said nip and said molding means is adapted to fuse said film material to said foamed material.

* * * * *